(12) United States Patent
Wu

(10) Patent No.: US 6,928,841 B2
(45) Date of Patent: Aug. 16, 2005

(54) OPTICAL FIBER PREFORM MANUFACTURE USING IMPROVED VAD

(75) Inventor: Fengqing Wu, Duluth, GA (US)

(73) Assignee: Furukawa Electric North America INC, Norcross, GA (US)

( * ) Notice: Subject to any disclaimer, the term of this patent is extended or adjusted under 35 U.S.C. 154(b) by 409 days.

(21) Appl. No.: 10/142,689

(22) Filed: May 10, 2002

(65) Prior Publication Data

US 2003/0209516 A1 Nov. 13, 2003

(51) Int. Cl.[7] .................. C03B 37/018; C03C 15/00
(52) U.S. Cl. ................................ 65/429; 65/421
(58) Field of Search .................. 65/397, 398, 399, 65/413, 414, 415, 416, 421, 427, 429, 435, 529, 531, 30.1

(56) References Cited

U.S. PATENT DOCUMENTS

| | | | | |
|---|---|---|---|---|
| 4,415,404 A | * | 11/1983 | Riegl | .......................... 216/80 |
| 4,592,932 A | * | 6/1986 | Biswas et al. | ........... 427/163.2 |
| 4,737,179 A | * | 4/1988 | Tanaka et al. | ................. 65/415 |
| 4,822,399 A | * | 4/1989 | Kanamori et al. | ............ 65/398 |
| 4,834,786 A | * | 5/1989 | Yamauchi et al. | ............ 65/412 |
| 4,935,045 A | * | 6/1990 | Yamauchi et al. | ............ 65/412 |
| 5,058,979 A | * | 10/1991 | Yamauchi et al. | ............ 385/28 |

* cited by examiner

Primary Examiner—Steven P. Griffin
Assistant Examiner—Lisa L. Herring
(74) Attorney, Agent, or Firm—Peter V. D. Wilde

(57) ABSTRACT

The specification describes a VAD method for producing optical fiber preforms by depositing soot onto a solid core rod. The solid core rod preferably has a uniform composition, doped or undoped, suitable for the center core region of the preform. The primary cladding layer, and additional cladding layers if desired, are produced by depositing soot on the center core rod. The surface of the center core rod is treated with an etchant torch that traverses the center core rod in front of the soot deposition torch. This produces a clean interface between the core and primary cladding. This soot-on-center-core-rod method allows the production of sharp index profiles by reducing the diffusion of dopants into and out of the center core portion of the preform that occurs in soot-on-soot processes.

14 Claims, 3 Drawing Sheets

OPTICAL FIBER PREFORM MANUFACTURE USING IMPROVED VAD

FIELD OF THE INVENTION

This invention relates to vapor axial deposition (VAD) processes for manufacturing optical fiber preforms.

BACKGROUND OF THE INVENTION

In a typical VAD process soot preforms are prepared by reacting glass precursors in an oxyhydrogen flame to produce silica particles. The silica particles are deposited on a starting rod. The starting rod is slowly pulled upward while it is rotated, and the silica particles are deposited axially on the rod as it is pulled. Very large, and long, soot preforms can be continuously fabricated. Typically the soot for the core is produced by a core torch and the soot for the cladding by a cladding torch. In this way, the composition of the glass can be varied from the center portion of the preform to the outside portion. Variation in glass composition is required for providing the refractive index difference necessary to produce light guiding in the optical fiber. After the soot is deposited, the preform is heated to consolidate the silica particles into a solid transparent glass body. Optical fiber is manufactured by drawing fiber from the consolidated preform using a conventional fiber drawing apparatus.

A variety of refractive index profiles are used in commercial optical fiber. These vary from simple step index profiles to graded index profiles to profiles with multiple index values. In most cases the center core of the preform used to draw these different varieties of fibers has a center core that is the same in each case.

For preforms made by a VAD process, a separate core deposition torch is used to deposit soot for this core, and another torch, a cladding torch, is used to deposit the soot for the outer cladding portion of the preform. In some cases more than two torches are used to form multiple layers for more complex profiles. After the entire preform is deposited, it is consolidated and drawn into an optical fiber.

The VAD process is very effective and widely used for preform manufacture. However, some optical fiber profiles require a relatively sharp interface between deposited layers. In some of these designs the sharp interface is used to control bending losses. Other optical fiber profiles have an undoped (pure silica) core. And in essentially all preform designs, control over preform diameter is important. The conventional VAD process is not ideally suited for producing sharp index gradients, or preforms with undoped cores. It also does not provide sharp control over preform diameter. This is due to heat from the second (or third) torch, which causes diffusion of dopants previously deposited by the first (or second) torch radially out from the center, or causes diffusion of dopants deposited by the second or subsequent torches radially in toward the center.

These problems have been overcome in part by the rod-in-tube process, wherein a core rod is first produced and cladding is provided after the core rod is consolidated. This reduces the opportunity for diffusion of dopants between doped layers in the preform. However, the interface between the previously prepared core rod and the cladding layer often has contaminants that deteriorate the optical transmission performance of the overall preform and resulting fibers.

A variation of the rod-in-tube approach is known in which the core rod is first prepared, as in the aforementioned rod-in-tube process, then the cladding is formed by soot deposition on the core rod. However, in this method also, it is difficult to control the quality of the interface between the core rod and the deposited soot.

In both methods just described, where a core rod is produced first, it is typical to produce a core rod that consists of a center core and an inner cladding layer. Then an outer cladding layer is provided by either an overcladding tube, or deposited soot. In either case, if the core rod/primary cladding is prepared by a VAD process, the problem of diffusion between dopants in the core and the first cladding layer remains.

SUMMARY OF THE INVENTION

We have developed a method for controlling the problem of interdiffusion of dopants between the center core and the primary cladding. This method also solves the problem of providing a quality interface between the core rod and soot deposited cladding. It one embodiment it involves producing a solid center core rod, with no cladding layers. Then soot is deposited to form the primary cladding layer, and subsequent cladding layers, if desired. In another embodiment, a core rod with a cladding is used, with overcladding produced by soot deposition, and the interface between the solid core rod and the deposited soot is controlled using the invention.

According to the invention, at least two torches are used in the soot deposition step, but only one torch produces soot. The other torch precedes the soot deposition torch and provides etchant gases that etch the surface of the previously prepared core rod. This provides a pristine surface for the soot deposition. With this approach, the surface of the core rod has essentially equivalent properties as a dual torch technique wherein the core and cladding are deposited in a single process. More than two torches, one a cleaning torch according to the invention, and the others for providing various core and cladding profiles, may be used.

DETAILED DESCRIPTION

Figure 1:
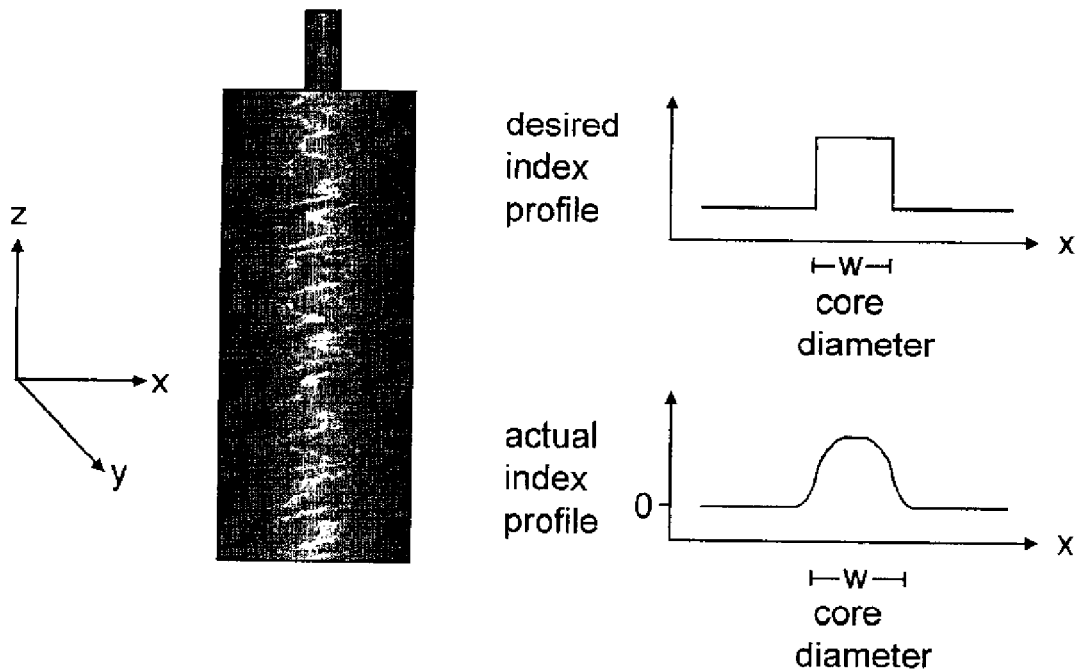
FIGS. 1 and 2 illustrate the problem of interdiffusion of dopants between core and cladding in conventional VAD processes.

FIG. 1 illustrates a preform with a desired refractive index profile shown to the right of the preform. This preform is designed with a germania doped core and an undoped cladding so that the refractive index of the core is higher than that of the cladding. A similar situation is encountered with a doped core and a lower doped cladding. These are the most widely used profiles in optical fiber manufacture. The actual refractive index profile is shown below the ideal profile. As is evident, the profile departs from ideal, with the core index tapered and the nominal core diameter spread. This shows the result of diffusion of $Ge^{+4}$ into the primary cladding layer. This diffusion is especially pronounced in a VAD process. Intuitively it may be understood that in that process, since both the core material and the cladding material are porous, diffusion of dopants in a gas phase unavoidably occurs. This is both more rapid and more difficult to control than solid diffusion of dopants in a consolidated (solid) glass.

Figure 2:
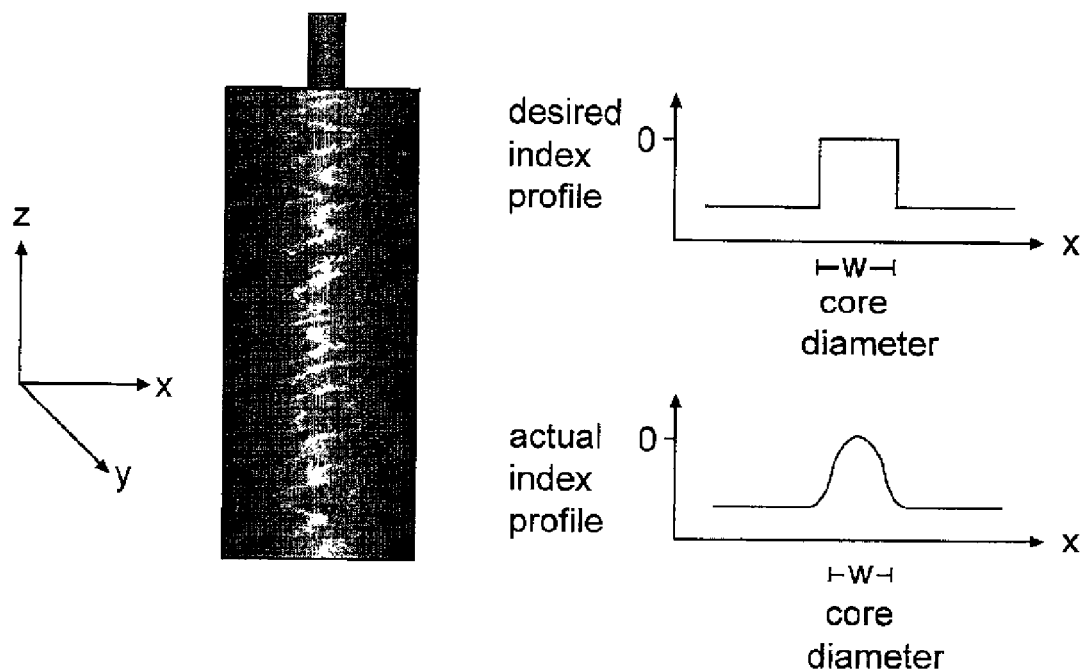

With reference to FIG. 2, the objective here is to form an undoped (pure silica) core and a down-doped cladding. The dopant for the cladding is typically fluorine. Again, the ideal profile is similar to that of FIG. 1, with sharp transitions and a precisely controlled diameter. The actual profile produced using a conventional VAD process shows a core with a tapered profile and a nominal diameter that is reduced. This results from unwanted diffusion of F⁻ from the cladding layer back into the core.

The following description of the invention is divided into separate sections, one for the embodiment where the primary cladding is produced by depositing soot on a center core rod that was previously prepared, and wherein the objective is to address the issues just described in connection with FIGS. 1 and 2, and a second, more general, embodiment where the center core rod has one or more cladding layers already present, and the issue addressed is controlling the quality of the interface between the core rod and the soot cladding layer.

To produce a profile with sharper transitions and better dimensional control, a center core rod with a uniform composition throughout is produced using a suitable preform preparation technique, preferably a VAD method. Since the technique used for making the center core rod does not form an essential part of the invention details of that preparation are not given here. In general, soot methods, or MCVD may be used. The core rod is referred to here as a "center" core rod, which is intended to mean a core rod with uniform doping, or that is undoped (pure silica). In both cases, the center core rod has a uniform, flat, refractive index profile. The center core rod may be produced following the general approaches described in U.S. Pat. No. 6,834,516 filed Apr. 24, 2002 which is incorporated herein by reference. Typically, if VAD is used it will have a single soot deposition torch. If the center core rod is to be pure silica, the glass precursor material will be $SiCl_4$.

Figure 3:
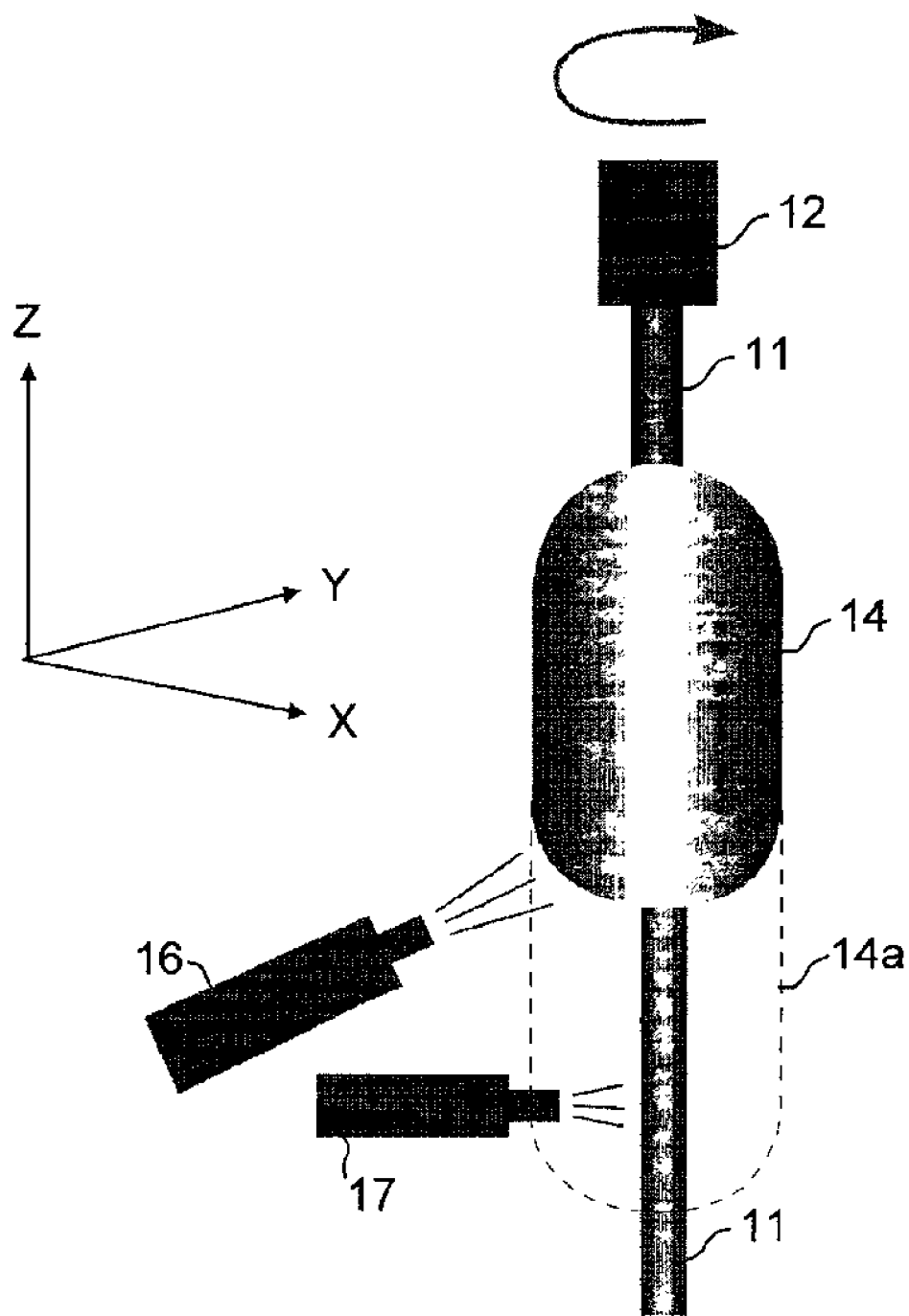
FIG. 3 is a schematic diagram of an apparatus for pulling a VAD preform using the method of the invention.

Using the previously prepared center core rod, after consolidation into a solid glass rod, soot is deposited onto the center core rod to form the primary cladding. This is illustrated in FIG. 3 where a chuck 12 supports the center core rod 11 in a vertical position. The center core rod is pulled in the z-direction during deposition, and is rotated during pulling as indicated by the arrow. The rotation minimizes dimensional variations in the preform. The x-, y-, and z-axes are shown to the left of the preform. Cladding soot 14 is deposited on the center core rod from cladding soot torch 16. The dashed portion 14a shows the preform after cladding soot is completely deposited. The surface of the center core rod is cleaned to produce a pristine surface using cleaning torch 17, that precedes the deposition torch as shown.

The gases supplied to the cladding soot torch are the fuel gases hydrogen and oxygen, and the glass presursor gases. The latter will comprise $SiCl_4$ for an undoped cladding layer, a mixture of $SiCl_4$ and $GeCl_4$ for a germanium doped layer (lower doped for the primary cladding), or a fluorine dopant source such as HF, or silane ($SiF_4$, $SiH_xF_y$) for a down-doped fluoride layer.

The gases supplied to the cleaning torch 17 comprise the conventional fuel gases for forming the flame, and one or more etchant gases. Suitable etchant gases are $CF_4$ or other fluoride gas $C_2F_6$, $SF_6$, $CCl_2F_2$, $C_2F_3Cl_3$ etc, or other halogen gases, such as $Cl_2$, HCl etc.

In another embodiment, cladding soot is deposited on a core rod that comprises both a center core region and a primary cladding. It may also comprise several cladding layers. In this embodiment the same deposition arrangement shown in FIG. 3 is used with the objective of ensuring the interface between the glass core rod 11 and the cladding 14 that is deposited over the glass core rod is clean.

Among the several advantages to the method of the invention is that a generic center core rod can be produced in large quantity, and inventoried for later use in making a wide variety of optical fiber preform designs. These stock center core rods can also be stretched to any desired shape. For example, a stock center core rod may be used as is for a multimode optical fiber, or may be stretched to a smaller core size for making single mode fiber.

The following examples illustrate the invention.

EXAMPLE 1

A soot preform was prepared using the dual torch arrangement shown in FIG. 3. The core rod was silica doped with 3.5% Ge. Pure silica soot was deposited while the core rod was pulled at a rate in the range 40–100 mm/hr. The pulling rate is automatically adjusted according to the growth rate of soot on the preform. The growth rate of soot is monitored by a laser that senses growth in the z-direction by directing a beam at the tip of the preform and measuring beam extinction. The pulling speed is measured by measuring the z-axis displacement of the pulling rod 12 in FIG. 3. The flow rate for $SiCl_4$ was 1500 cc/min. Flow rates of the gases supplied to the deposition torch, including the fuel gases, will vary widely depending on the design of the apparatus used. The gas supply to cleaning torch 17 comprised the fuel gases hydrogen and oxygen, and 200 cc/min $CF_4$. Refractive index profiles with preforms produced by this technique uniformly reflect sharp index transitions, and precise core dimensions.

EXAMPLE 2

The same general method described in Example 1 was followed except that in this example the center core rod is pure silica and the soot deposited was fluorine doped. Again the result is sharp and controlled profiles.

After deposition of the soot and formation of the porous soot cladding layer, the porous layer is then consolidated by heating to a temperature sufficient to melt the silica particles (doped or undoped) into a solid, dense, glass preform. Consolidation is typically performed by heating the soot body to a temperature of 1400° C. to 1600° C. The solid preform is then ready for mounting in a fiber draw apparatus and drawing optical fiber, which will be discussed below.

Figure 4:
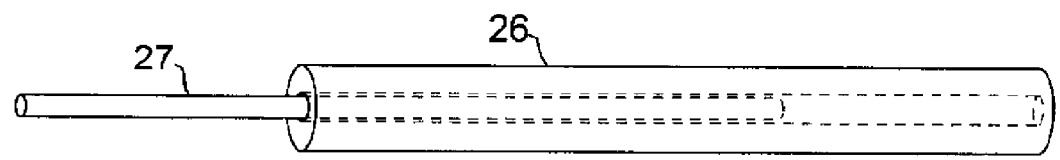
FIGS. 4 and 5 are schematic representations of a rod-in-tube process for making a preform using a VAD core rod.
Figure 5:
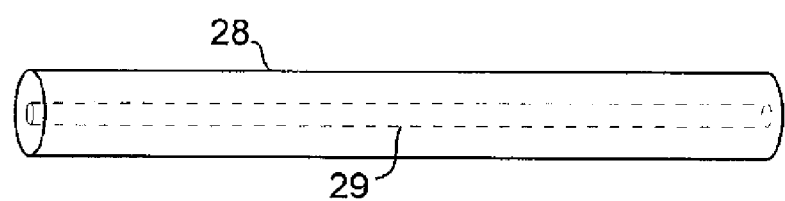

The examples described are useful for producing a variety of types of preforms. It is especially well adapted for preparing core rods with a primary cladding layer. As indicated earlier, outside cladding may be made using other, less expensive, techniques. Accordingly, it is often useful to employ a rod-in-tube approach. A typical rod-in-tube process is shown in FIGS. 4 and 5. The drawing is not to scale. The cladding tube is shown in FIG. 4 at 26. A typical length to diameter ratio is 10–15. The core rod 27 is shown being inserted into the cladding tube. The rod at this point is typically already consolidated. In an alternative overcladding method, cladding soot is deposited on top of a core rod.

As mentioned above, there exist several common options for the composition of the core rod. It may be pure silica, with a down-doped cladding. It may have a pure silica center region with a down doped outer core region. It may have an up-doped, e.g. germania doped, center core region surrounded by a pure silica region. It may have an up-doped center core region surrounded by a down doped outer core region. All of these options are well known in the art and require no further exposition here. After assembly of the rod 27 and tube 26, the combination is sintered to produce the final preform 28 shown in FIG. 5, with the core 29 indistinguishable from the cladding except for a small refractive index difference.

Typical dimensions of the rod and cladding tube are also well known. The diameter of a consolidated cladding tube for a standard multi-mode fiber is approximately twice the diameter of the core rod. In the case of a preform for a single mode fiber the diameter of the rod is approximately 5% of the final diameter of the cladding tube.

Figure 6:
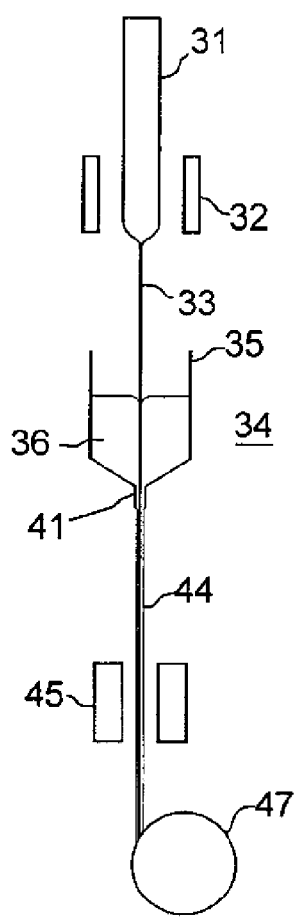
FIG. 6 is a schematic representation of a fiber drawing apparatus useful for drawing preforms, made by the invention, into continuous lengths of optical fiber.

The completed preform is then used for drawing optical fiber in the conventional way. FIG. 6 shows an optical fiber drawing apparatus with preform 31 and susceptor 32 representing the furnace (not shown) used to soften the glass preform and initiate fiber draw. The drawn fiber is shown at 33. The nascent fiber surface is then passed through a coating cup, indicated generally at 34, which has chamber 35 containing a coating prepolymer 36. The liquid coated fiber from the coating chamber exits through die 41. The combination of die 41 and the fluid dynamics of the prepolymer, controls the coating thickness. The prepolymer coated fiber 44 is then exposed to UV lamps 45 to cure the prepolymer and complete the coating process. Other curing radiation may be used where appropriate. The fiber, with the coating cured, is then taken up by take-up reel 47. The take-up reel controls the draw speed of the fiber. Draw speeds in the range typically of 1–20 m/sec. can be used. It is important that the fiber be centered within the coating cup, and particularly within the exit die 41, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus in FIG. 6 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylates. In commercial practice both materials may be low and high modulus acrylates. The coating thickness typically ranges from 150–300$\mu$m in diameter, with approximately 240$\mu$m standard.

Reference herein to silica preforms means highly pure silica bodies. The silica base material for optical fiber preforms necessarily excludes impurities such as water or iron. They may however, include small amounts of dopants, such as fluorine, for modifying refractive index. Typical optical fiber is more than 85% silica by weight.

As described above, the invention involves traversing the core rod sequentially with an etchant flame followed immediately by a soot flame. It is preferred that the sequence be such that the core rod remains heated (i.e. is not allowed to cool to room temperature) from the etchant flame when exposed to the soot flame. This prevents the core rod surface from re-acquiring surface contaminants prior to soot deposition.

In concluding the detailed description, it should be noted that it will be obvious to those skilled in the art that many variations and modifications may be made to the preferred embodiments without substantial departure from the principles of the present invention. All such variations, modifications and equivalents are intended to be included herein as being within the scope of the present invention, as set forth in the claims.

What is claimed is:

1. Process for the manufacture of an optical fiber preform comprising the steps of:
    (a) preparing a core rod of solid glass,
    (b) traversing the core rod sequentially with an etchant flame to etch the core rod followed immediately by a soot flame to deposit soot on the core rod so that the core rod is exposed to the etchant flame and the soot flame simultaneously.

2. The process of claim 1 wherein the etchant flame is produced by:
    (i) flowing together:
        a flow of etchant gas, and
        a flow of fuel gas, to form an etchant gas mixture,
    (ii) igniting the etchant gas mixture to form the etchant flame.

3. The process of claim 2 wherein the soot flame is produced by:
    (i) flowing together:
        a flow of one or more glass precursor gases, and
        a flow of fuel gas, to form a soot gas mixture,
    (ii) igniting the soot gas mixture to form the soot flame.

4. The process of claim 3 wherein the etchant gas comprises a fluoride gas.

5. The process of claim 4 wherein the etchant gas comprises $CF_4$.

6. The process of claim 3 wherein the fuel gas comprises a mixture of hydrogen and oxygen.

7. The process of claim 3 wherein the glass precursor gases comprise $SiCl_4$ and $GeCl_4$.

8. The process of claim 3 wherein the glass precursor gases comprise $SiCl_4$.

9. The process of claim 3 including the step of heating the soot to consolidate it into solid glass.

10. The process of claim 1 wherein the core rod remains heated while traversed by the etchant flame and the soot flame.

11. Process for the manufacture of an optical fiber preform comprising the steps of:
    (a) preparing a core rod of solid glass,
    (b) traversing the core rod sequentially with an etchant flame to etch the core rod followed immediately by a first soot flame and a second soot flame to deposit soot on the core rod so that the core rod is exposed to the etchant flame and the soot flame simultaneously,
    wherein the etchant flame is produced by:
    (i) flowing together:
        a flow of etchant gas, and
        a flow of fuel gas, to form an etchant gas mixture,
    (ii) igniting the etchant gas mixture to form the etchant flame and the first and second soot flames are each produced by
    (i) flowing together:
        a flow of one or more glass precursor gases, and
        a flow of fuel gas, to form a soot gas mixture,
    (ii) igniting the soot gas mixture to form the soot flame and further wherein the soot produced by the second flame has a composition different from the soot produced by the first flame.

12. The process of claim 11 wherein the core rod remains heated while traversed by the etchant flame and the soot flame.

13. Process for the manufacture of optical fibers comprising:
   (a) preparing a preform, the preform having a core region and a cladding region comprising the steps of:
      (i) preparing a core rod of solid glass;
      (ii traversing the core rod sequentially with an etchant flame to etch the core rod followed immediately by a first soot flame and a second soot flame to deposit soot on the core rod so that the core rod is exposed to the etchant flame and the soot flame simultaneously, and
      (iii) heating the soot to consolidate the soot into solid glass,
   (b) mounting the preform in an optical fiber drawing apparatus,
   (c) heating the preform to soften the glass, and
   (d) drawing an optical fiber from the preform.

14. The process of claim 13 wherein the core rod remains heated while traversed by the etchant flame and the soot flame.

* * * * *